United States Patent [19]

Honda et al.

[11] 4,369,299
[45] * Jan. 18, 1983

[54] ACRYLIC RESIN HAVING EXCELLENT SOLVENT RESISTANCE AND MOLDABILITY

[75] Inventors: Makoto Honda, Tokyo; Kohe Ozawa, Fujisawa; Kazuhiro Hosoya, Tokyo; Jiro Kurita, Yokohama, all of Japan

[73] Assignee: Asahi Kasei Kogyo Kabushiki Kaisha, Japan

[*] Notice: The portion of the term of this patent subsequent to Jan. 20, 1998, has been disclaimed.

[21] Appl. No.: 126,117

[22] Filed: Feb. 29, 1980

Related U.S. Application Data

[63] Continuation-in-part of Ser. No. 957,887, Nov. 6, 1978, Pat. No. 4,246,382.

[30] Foreign Application Priority Data

Nov. 11, 1977 [JP] Japan ................................. 52-134728
Feb. 22, 1978 [JP] Japan ................................. 53-19514
May 17, 1978 [JP] Japan ................................. 53-58476
Jul. 6, 1978 [JP] Japan ................................. 53-81438
Mar. 5, 1979 [JP] Japan ................................. 54-25214

[51] Int. Cl.³ .......................... C08F 2/38; C08F 20/14
[52] U.S. Cl. ................................. 526/329.7; 526/85; 526/328.5
[58] Field of Search ........................... 526/328.5, 329.7

[56] References Cited

U.S. PATENT DOCUMENTS

| | | | |
|---|---|---|---|
| 3,198,775 | 8/1965 | Delacretaz et al. | 526/79 |
| 3,272,786 | 9/1966 | Perry | 526/185 |
| 3,960,824 | 6/1976 | Hicks | 526/85 |
| 4,039,500 | 8/1977 | Bassett et al. | 260/29.6 R |
| 4,145,494 | 3/1979 | Neubert | 526/81 |
| 4,246,382 | 1/1981 | Honda et al. | 526/79 |

FOREIGN PATENT DOCUMENTS

| | | |
|---|---|---|
| 828803 | 2/1960 | United Kingdom . |
| 896905 | 5/1962 | United Kingdom . |
| 907426 | 10/1962 | United Kingdom . |
| 967051 | 8/1964 | United Kingdom . |
| 971673 | 9/1964 | United Kingdom . |
| 1040690 | 9/1966 | United Kingdom . |
| 1202597 | 8/1970 | United Kingdom . |
| 1269964 | 4/1972 | United Kingdom . |
| 1270292 | 4/1972 | United Kingdom . |
| 1303908 | 1/1973 | United Kingdom . |
| 1324190 | 7/1973 | United Kingdom . |
| 1393273 | 5/1975 | United Kingdom . |

OTHER PUBLICATIONS

CPI Abstract 60467W/37, (German Auslegeschrift No. 1,645,232).
CPI Abstract 96002P (Swiss Patent No. 487,946).

Primary Examiner—Harry Wong, Jr.
Attorney, Agent, or Firm—Finnegan, Henderson, Farabow, Garrett & Dunner

[57] ABSTRACT

An acrylic resin having an intrinsic viscosity $[\eta]$ of about 0.028 to about 0.117 l/g and a weight-average molecular weight to number-average molecular weight ratio (Mw/Mn), measured by gel permeation chromatography of about 2.3 to about 6.0, said resin comprising the polymerization product of (1) about 50 to 100 wt. % of methyl methacrylate and (2) 0 to about 50 wt. % of at least one monomer selected from the group consisting of acrylic ester monomer and methacrylic ester monomer, said acrylic ester monomer comprising the reaction product of an alkyl alcohol having 1 to 8 carbon atoms and acrylic acid and said methacrylic ester comprising the reaction product of an alkyl alcohol having 2 to 12 carbon atoms and methacrylic acid.

5 Claims, No Drawings

ACRYLIC RESIN HAVING EXCELLENT SOLVENT RESISTANCE AND MOLDABILITY

CROSS-REFERENCES TO RELATED APPLICATIONS

This application is a continuation-in-part of copending application Ser. No. 957,887 filed on Nov. 6, 1978, now U.S. Pat. No. 4,246,382.

BACKGROUND OF THE INVENTION

The present invention relates to an acrylic resin having an excellent solvent resistance, and to such a resin further having excellent moldability into sheets by extrusion. The resin has the molecular weight, the distribution of molecular weight and rheological properties within a specific range.

Acrylic resins are widely used in various fields as molding materials due to their excellent transparency, luster, surface hardness, weatherability, mechanical strength, heat distortion resistance, etc.

Conventional acrylic resins, however, are often subject to the defect of crazing or crack formation when they are brought into contact with an organic solvent, such as ethanol, thinner for paints, etc. Examples of instances when organic solvents may come into contact with acrylic resins with resultant crazing or crack formation include when an antistatic agent is coated on an acrylic resin molding using ethanol as a diluent, or when the resins are subjected to printing or coating using an organic solvent as a thinner, or when acrylic resin plates are bendfabricated and adhered to each other using methylene chloride or the like. Since crazing or crack formation spoils the excellent appearance of acrylic resins, and since their excellent appearance is one of their substantial merits, crazing or crack generation in acrylic resins is a substantial problem.

The resistance of acrylic resins to occurrence of crazing or crack formation when they are brought into contact with an organic solvent (referred to herein as "solvent resistance") depends upon the kinds and proportions of copolymerized monomers, average molecular weight, and the kinds and amounts of various additives, such as lubricants or plasticizers, added to the resins for various purposes. In general, the solvent resistance increases as the molecular weight of the resin increases. However, if the molecular weight becomes too high, melt viscosity becomes so high that workability decreases, making molding difficult. Hence molecular weight can not be increased without restriction.

In order to reduce the melt viscosity for molding workability, methyl methacrylate (hereinafter abbreviated as MMA) has been copolymerized with acrylic ester (hereinafter abbreviated as AE) and/or a methacrylic ester (hereinafter abbreviated as MAE) consisting of the reaction product of an alkyl alcohol having two or more carbon atoms and methacrylic acid. It is also known to reduce melt viscosity by adding a lubricant or a plasticizer, such as stearyl alcohol, cetyl alcohol, dibutyl phthalate, 2-ethylhexyl phthalate, etc. However, these methods decrease the heat distortion temperature (HDT), and hence there are inherent limits on the copolymerization ratio and the amounts of the additives that may be employed. Acrylic resins should have a heat distortion temperature of not lower than 70° C. measured in accordance with ASTM D 648, or practical problems are presented in some cases.

As discussed above, molecular weight of the resin, copolymerization ratio, and the kinds and the amounts of additives that may be employed are restricted because of practical requirements for molding workability and heat distortion temperature etc. Thus, there have been known no molding materials simultaneously satisfying molding workability, practically satisfactory physical properties and solvent resistance.

The sheets of acrylic resins are usually manufactured by casting or extrusion. In the casting process, monomers or syrup thereof is cast in the space between two glass or polished stainless steel plates located opposite each other by means of gaskets. After the monomer has been polymerized, glass or stainless steel plates are removed to take out the sheet which is cut into given dimensions. This process is advantageous in that it gives products having highly smooth surfaces. But it is disadvantageous in that the products generally have high molecular weights and less processability, and inevitably bring about cutting scraps that are impossible to reuse. The process requires labor-intensive work in the case of batchwise operation or requires a huge amount of investment on equipment in the case of continuous operation, thus causing higher producing cost in either case.

On the other hand, in the extrusion process, a previously polymerized acrylic resin is molten, extruded continuously from a T-die, passed through glazing rolls or other glazing devices and cooling devices to give smooth and cool surfaces, and is cut into sheets of given dimensions. Even if this process has a difficulty in the occurrence of surface defects due to uneven roll pressing, it allows free selection of comonomers, and easy control of molecular weight within a relatively low range, thereby providing sheets of good processability. In addition, the process allows the reuse of cutting scraps and requires less labor-intensive work. For these reasons, the extrusion process is more advantageous in the reduction of producing cost than the above described casting process, and therefore is more advantageous as a process of industrial practice.

Usually in extrusion molding, the take-off is operated by adjusting the roll speed in such a way that the resinous plate, when extruded from a T-die, does not sag excessively. Such an operation inevitably causes the product to have a width less than that of the die. In order to obtain products of a predetermined width, a considerable degree of skill has been required in the design of die width. In operation, it seems desirable to adjust the roll speed in favor of small drawdown, so as to obtain those products having a width as close to the die width as possible. If, however, the takeoff were operated in such a manner, the extruded sheet would usually sag and stick to the lower roll, causing various troubles including surface defects.

Further, it is a common practice in sheet production by means of extrusion molding that a bank (retained resin) is formed at the nip between two rolls. This bank serves to buffer the small fluctuations in extrusion rate as well as in the take-off speed of rolls. In cases of various acrylic resins of prior art, a sufficient amount of bank cannot be retained at the nip. These resins incurred various problems, particularly when thin sheets were to be produced. If the roll speed is adjusted for larger bank in the production of thin sheets, the resinous sheets leaving the die have sagged, causing above described troubles. The above described difficulties have been overcome by the present invention.

We have intensively studied to cope with these difficulties of acrylic resins of prior art. As a result, we have discovered that the key factors to solvent resistance and easy extruding of sheets of acrylic resins are the molecular weight, the distributions of molecular weight and rheological properties at their molten state.

SUMMARY OF THE INVENTION

The object of the present invention is to provide an acrylic resin having an intrinsic viscosity [η] of about 0.028 to about 0.117 l/g and a weight-average molecular weight to number-average molecular weight ratio (Mw/Mn), measured by gel permeation chromatography of about 2.3 to about 6.0, said resin comprising the polymerization product of (1) about 50 to 100 wt. % of methyl methacrylate and (2) 0 to about 50 wt. % of at least one monomer selected from the group consisting of acrylic ester monomer and methacrylic ester monomer, said acrylic ester monomer comprising the reaction product of an alkyl alcohol having 1 to 8 carbon atoms and acrylic acid and said methacrylic ester comprising the reaction product of an alkyl alcohol having 2 to 12 carbon atoms and methacrylic acid.

DESCRIPTION OF THE PREFERRED EMBODIMENTS

The acrylic resin of the present invention is an MMA homopolymer or a copolymer containing not less than 50 wt. %, and preferably not less than 80 wt. %, of an MMA component. Suitable copolymer components are AE and/or MAE.

As the copolymerizable AE, esters comprising the reaction produce of an alkyl alcohol having 1 to 8 carbon atoms and acrylic acid can be used. Specific examples thereof include methyl acrylate, ethyl acrylate, n-butyl acrylate and 2-ethylhexyl acrylate. As MAE, there can be used esters comprising the reaction product of an alkyl alcohol having 2 to 12 carbon atoms and methacrylic acid. Specific examples thereof include ethyl mechacrylate, n-butyl methacrylate, 2-ethylhexyl methacrylate, and lauryl methacrylate.

To the acrylic resin, if necessary, can be added conventional additives, such as plasticizers, lubricants, mold release agents, stabilizers, colorants, etc. in conventional amounts not exceeding 20 wt. % of the acrylic resin.

In the present invention, it is necessary to adjust the intrinsic viscosity, [η], of the resulting acrylic resin within the range of 0.028 to 0.117 l/g. If the intrinsic viscosity is less than about 0.028 l/g, mechanical strength decreases to a degree that is practically unsatisfactory. If the intrinsic viscosity is more than about 0.117 l/g, the melt viscosity becomes so high that molding work becomes difficult or impossible.

As used herein, intrinsic viscosity, [η], is determined at 20° C. using chloroform as a solvent, and is in the relation represented by the following equation with the viscosity-average molecular weight, M:

$$[\eta] = 4.85 \times 10^{-6} M^{0.8} \, (l/g)$$

An intrinsic viscosity of 0.028 to 0.117 l/g corresponds to a viscosity-average molecular weight of 50,000 to 300,000.

In accordance with the present invention, the ratio of weight-average molecular weight, Mw, to number-average molecular weight, Mn (Mw/Mn) measured according to GPC must be within the range of 2.3 to 6.0 to obtain the desired improvement in the solvent resistance of the acrylic resin. If this ratio (Mw/Mn) exceeds about 6.0, mechanical strength of the resin will be reduced to such a low degree that the acrylic resin obtained is not of practical use. On the other hand, if it is less than about 2.3, the solvent resistance will not be improved and the resultant acrylic resin will have the same solvent resistance problem as conventional ones. A particularly preferred Mw/Mn ratio is within the range of 2.5 to 6.0.

Measurement of the molecular weight distribution through GPC is generally effected in a manner such as is described in, e.g., Takeda et al; "Gel Chromatography (Fundamental Part)," published by Kodansha, pp. 97–122. For example, molecular weight distribution of the acrylic resin can be determined as follows:

Two columns of HSG-20 and -50 (made by Shimazu Seisakusho Ltd.) are used as columns, and a calibration chart is made using standard polystyrene produced by Pressure Chemical Co. An elution curve of a 0.5 wt. % tetrahydrofuran solution of acrylic resin obtained by GPC is equally divided, and the height at each division point is measured. Using tetrahydrofuran as a carrier solvent, and measurements effected at 30° C. at a flow rate of 1–1.5 ml/min, the weight-average molecular weight and the number-average molecular weight are determined according to the following equations:

$$Mw = \frac{Q_M \sum_i \{H_i M_i(P)\}}{Q_P \sum_i H_i} \quad (1)$$

$$Mn = \frac{Q_M \sum_i H_i}{Q_P \sum_i \left(\frac{H_i}{M_i(P)}\right)} \quad (2)$$

wherein Hi represents a height of elution curve at division point i, Mi(P) represents a molecular weight of the standard polystyrene at division point i, and $Q_M$ and $Q_P$ represent Q factors of acrylic resin and polystyrene and are 39 and 41, respectively.

For the extrusion of sheets to be easy, the acrylic resin of the present invention needs to have a melt index of from 0.1 to 20 g/10 min and a swell in the range of 25–40%, as measured under conditions of ASTM D-1238 (230° C., 3.8 kg), and also has a falling-weight impact strength of at least 5 kg-cm, as measured on a 50% failure energy test with 2-mm plates in accordance with JIS K-7211.

With regard to the fluidity, acrylic resins of the present invention used as a molding material for sheets must have a melt index in the range of 0.1 to 20 g/10 min, as measured under conditions of D-1238 (230° C., 3.8 kg). A melt index lower than 0.1 g/10 min will bring about remarkably low fluidity of the resins and remarkably high motor load during extrusion thereof, thus making extrusion molding quite difficult. In addition, surfaces of sheets obtained have no smoothness and luster. A melt index higher than 20 g/10 min will cause the extruded resin to sag to a large extent between die and rolls, thus failing likewise to provide sheets having good surfaces. The sheet thus obtained has low mechanical strength.

With regard to the Barus effect which is resilient behavior, it is necessary for the acrylic resins of the present invention to have a swell in the range of 25-40%, preferably in the range of 28-40%. The swell is determined by using a melt index measuring device stipulated in ASTM D-1238, measuring the diameter, D, of strands which have been extruded under the conditions of 230° and 8.7 kg, and calculated in the following equation:

$$\text{Swell} = \frac{D - D_o}{D_o} \times 100$$

wherein $D_o$ is the diameter of a die from which resin is extruded.

Acrylic resins of prior art have a swell of 20% or less. In a case of a swell less than 25%, it is difficult to coordinate the normal bank with the resin sag between the die and the rolls at the time of extrusion molding. Even a skilled operator is apt to cause surface defects. It is unavoidable that the width of thus-obtained extruded sheets is considerably smaller than the die width.

On the other hand, in the case of a swell of 25% or more, it is easy to coordinate the suitable bank with resin sagging. In that case a non-skilled operator can handle the operation without causing no defect on the surfaces. The width of extruded sheets can be made close to the die width.

If the swell exceeds 40%, the resin is not preferred, as it contains many fractions of low molecular weight and has a low falling-weight impact strength of sheets.

In an aspect, the sheets of acrylic resins are required to maintain mechanical strength sufficients to endure ordinary use. Among the items of mechanical strength of acrylic resins, most important is the impact strength. For practical use, the 2-mm sheets with smooth defectless surfaces obtained by extrusion molding are required to exhibit a falling-weight impact strength of at least 5 kg-cm, as measured on a 50% failure energy test in accordance with JIS K-7211. This requirement cannot be met if an acrylic resin has a low molecular weight or if it contains many fractions of low molecular weights.

Preferred requirements for rheological properties will be described below for the methyl methacrylate polymer, the copolymer of methyl methacrylate and an alkyl acrylate, and the copolymer of methyl methacrylate and an alkyl methacrylate. These requirements cannot be fulfilled until molecular weight and molecular weight distribution are strictly controlled within specific ranges.

The above described resins are required to have an intrinsic viscosity $[\eta]$ of 0.033 to 0.117 l/g. If the intrinsic viscosity is less than 0.033 l/g, mechanical strength decreases to a practically unsatisfactory level for the extruded sheets. If the intrinsic viscosity is more than 0.117 l/g, the melt viscosity goes up to such a high level as to make extrusion molding difficult. The resin sheet obtained by forced extrusion would not give smooth, lustrous surfaces.

An intrinsic viscosity of 0.033 to 0.117 l/g corresponds to a viscosity-average molecular weight of 60,000 to 300,000.

In accordance with the present invention, the ratio (Mw/Mn) of weight-average molecular weight, Mw, to number-average molecular weight, Mn, as measured by GPC, is preferably in a range of from 2.3 to 4.0, in order to improve processability in extrusion of flat plates retaining a swell of at least 25% and to maintain a level of mechanical strength adequate for practical use as extruded sheets. If the ratio of Mw/Mn is 2.2 or less, there would be no substantial improvement in the processability of sheets. If Mw/Mn exceeds 4.0, the mechanical strength of resins would be reduced to such a large extent that the acrylic resin obtained is of no practical use as extruded sheets. It is preferred that the Mw/Mn ratio is within a range of 2.5 to 4.0.

In cases of acrylic resins of the present invention, the fraction having molecular weight of 20,000 or lower, as measured by GPC, must be 25% or less; the fraction having molecular weights of 1,000,000 or higher must be 2.5% or less.

If the fraction having molecular weight of 20,000 or lower exceed 25%, the mechanical strength of resin will be reduced to a practically unusable for extruded sheets. Employment of the fraction having molecular weight of 1,000,000 or higher in an amount exceeding 2.5% is not preferred, because it becomes difficult to produce smooth-surfaced resin sheets.

Amount of the fraction having molecular weight of 20,000 or less, X%, and amount of the fraction having molecular weight of 1,000,000 or higher, Y%, are respectively calculated from an eluation curve of above-described GPC, using the following equations:

$$X = \frac{\sum\limits_{o}^{x} Hi}{\sum\limits_{y}^{\infty} Hi} \times 100 \quad (\%)$$

$$Y = \frac{\sum\limits_{y}^{\infty} Hi}{\sum\limits_{o}^{\infty} Hi} \times 100 \quad (\%)$$

wherein x is an eluation point corresponding to a molecular weight of 20,000; y is an eluation point corresponding to a molecular weight of 1,000,000.

Since the acrylic resins of the present invention have an excellent solvent resistance and superior moldability into sheets as described above, they are extremely useful from the industrial point of view.

EXAMPLES 1-8

4,000 g of a monomer solution comprising 100 parts by weight of a monomer mixture comprising methyl methacrylate and methyl acrylate in composition ratio shown in Table 1, 0.3 part by weight of lauroyl peroxide and 0.24 part by weight of n-dodecylmercaptan was suspended in 6,000 g of a suspension phase comprising 250 parts by weight of water and 1 part by weight of potassium polymethacrylate. Polymerization was initiated at a polymerization temperature of 80° C. and, 70 minutes after initiation of the polymerization, 0.25 part by weight of n-dodecylmercaptan was added thereto. The reaction was allowed to further advance to completion, with bead-like resin being obtained. The thus obtained resin was washed, filtered out and dried.

The resulting resin was molded using an injection molding machine (Neomat 47/28, made by Sumitomo Shipbuilding and Machinery Co., Ltd.) to obtain transparent, plane plate-like injection moldings (3 mm×20 mm×130 mm). As molding conditions, cylinder temperature was 230° C., injection pressure was 600 kg/cm², and mold temperature was at three levels (30° C., 40° C. and 50° C.). The thus obtained moldings were left for 24 hours at 20° C. and at a humidity of 60% for moisture conditioning, then dipped for 1 minute in a 25° C. ethanol or xylene solution to observe the state of cracks formed. Intrinsic viscosities and molecular weight distributions (Mw/Mn) determined through GPC (LC-1 made by Shimazu Seisakusho, Ltd.) are shown in Table 1.

In addition, the thus obtained resins were molded into sample pieces (6 mm×12.5 mm×125 mm) under the conditions of 230° C. in cylinder temperature, 700 kg/cm$^2$ in injection pressure and 50° C. in mold temperature using an injection molding machine (Meomat 47/28, made by Sumitomo Shipbuilding and Machinery Co., Ltd.). After conditioning for 24 hours at a temperature of 20° C. and at a humidity of 60%, the heat distortion temperature was determined in accordance with the procedure of ASTM D 648. The results are shown in Table 1.

acrylate. Polymerization was initiated at a polymerization temperature of 75° C. and n-dodecylmercaptan was added thereto in the amounts shown in Table 2 after the times shown in Table 2. The reaction was allowed to further advance to the completion to obtain bead-like resin, which was washed and dried.

Intrinsic viscosities and Mw/Mn of the resins and the state of crack formation upon dipping the moldings of the resins into a solvent were examined and the results of these examinations are shown in Table 2. Additionally, heat distortion temperature was 76° C. with all samples.

As a comparative example, a sample with a low Mw/Mn, prepared without additional addition of n-dodecylmercaptan is also given in Table 2.

TABLE 1

| Ex. No. | Composition (wt. %) | | $[\eta]^2$ | Mw/Mn$^3$ | °C.$^4$ | Cracking$^5$ | | | | | |
|---|---|---|---|---|---|---|---|---|---|---|---|
| | | | | | | Mold temp.$^6$ | | Mold temp.$^7$ | | Mold temp.$^8$ | |
| | MMA | MA$^1$ | | | | Xylene | Ethanol | Xylene | Ethanol | Xylene | Ethanol |
| 1 | 94 | 6 | 0.050 | 2.5 | 86 | Many cracks | Many cracks | Slight cracks | Slight cracks | None | None |
| 2 | 89 | 11 | 0.050 | 2.5 | 81 | Slight cracks | Slight cracks | Extremely slight cracks | Extremely slight cracks | None | None |
| 3 | 88 | 12 | 0.050 | 2.5 | 80 | None | None | None | None | None | None |
| 4 | 87 | 13 | 0.050 | 2.5 | 79 | None | None | None | None | None | None |
| 5 | 85 | 15 | 0.050 | 2.5 | 74 | None | None | None | None | None | None |
| 6 | 84 | 16 | 0.050 | 2.5 | 73 | None | None | None | None | None | None |
| 7 | 82 | 18 | 0.050 | 2.5 | 70 | None | None | None | None | None | None |
| 8 | 80 | 20 | 0.050 | 2.5 | 68 | None | None | None | None | None | None |

$^1$Methyl acrylate
$^2$Intrinsic viscosity (l/g)
$^3$Weight-average molecular weight to number-average molecular weight ratio
$^4$Heat distortion temperature
$^5$Formation of cracks upon dipping in a solvent
$^6$Mold temperature: 30° C.
$^7$Mold temperature: 40° C.
$^8$Mold temperature: 50° C.

TABLE 2

| Example 9 Sample No. | n-Dodecylmercaptan Added amount (parts) | | Min.$^1$ | $[\eta]^4$ | Mw/Mn$^5$ | Cracking$^6$ | | | | | |
|---|---|---|---|---|---|---|---|---|---|---|---|
| | | | | | | Mold temp.$^7$ | | Mold temp.$^8$ | | Mold temp.$^9$ | |
| | In.$^2$ | Add.$^3$ | | | | Xylene | Ethanol | Xylene | Ethanol | Xylene | Ethanol |
| 1 | 0.14 | 0.27 | 40 | 0.060 | 2.3 | Extremely slight cracks | Extremely slight cracks | Extremely slight cracks | Extremely slight cracks | None | None |
| 2 | 0.19 | 0.20 | 70 | 0.060 | 2.5 | None | None | None | None | None | None |
| 3 | 0.15 | 0.50 | 40 | 0.050 | 2.8 | None | None | None | None | None | None |
| 4 | 0.20 | 0.50 | 70 | 0.055 | 3.5 | None | None | None | None | None | None |
| 5 | 0.10 | 0.60 | 70 | 0.070 | 4.1 | None | None | None | None | None | None |
| 6 | 0.11 | 0.90 | 70 | 0.080 | 5.0 | None | None | None | None | None | None |
| * | 0.35 | — | — | 0.050 | 2.0 | Many cracks | Many cracks | Many cracks | Many cracks | Many cracks | Many cracks |
| * | 0.24 | — | — | 0.070 | 2.0 | Many cracks | Many cracks | Many cracks | Many cracks | Many cracks | Many cracks |

$^1$Stage of additional addition (minutes)
$^2$Initial amount
$^3$Additional amount
$^4$Intrinsic viscosity (l/g)
$^5$Weight-average molecular weight to number-average molecular weight ratio
$^6$Formation of cracks upon dipping in a solvent
$^7$Mold temperature: 30° C.
$^8$Mold temperature: 40° C.
$^9$Mold temperature: 50° C.
*Comparative Examples

EXAMPLE 9

4,000 g of a monomer solution comprising 100 parts by weight of a monomer mixture of 86% methyl methacrylate and 14% methyl acrylate, 0.1 part by weight of azobisisobutyronitrile and n-dodecylmercaptan in an amount shown in Table 2 was suspended in 6,000 g of a suspension phase comprising 150 parts by weight of water and 0.6 part by weight of potassium polymeth-

EXAMPLES 10-15

Resins were obtained by polymerizing, in the same manner as in Examples 1-8, a monomer mixture of methyl methacrylate and methyl acrylate, ethyl acrylate or butyl acrylate as shown in Table 3. Intrinsic viscosities, Mw/Mn and heat distortion temperature (HDT) of the resulting resins and cracks of the moldings thereof upon dipping in a solvent were examined. With every sample, intrinsic viscosity and Mw/Mn were 0.050 l/g and 2.5, respectively. Heat distortion temperatures and the state of crack formation are shown in Table 3.

TABLE 3

| Ex. No. | Composition (wt. %) | | | | HDT[1] (°C.) | Formation of cracks upon dipping in a solvent | | | | | |
|---|---|---|---|---|---|---|---|---|---|---|---|
| | MMA | Methyl acrylate | Ethyl acrylate | Butyl acrylate | | Mold temp.[2] | | Mold temp.[3] | | Mold temp.[4] | |
| | | | | | | Xylene | Ethanol | Xylene | Ethanol | Xylene | Ethanol |
| 10 | 88 | — | 12 | — | 77 | None | None | None | None | None | None |
| 11 | 85 | — | 15 | — | 72 | None | None | None | None | None | None |
| 12 | 91 | — | — | 9 | 78 | None | None | None | None | None | None |
| 13 | 87 | — | — | 13 | 70 | None | None | None | None | None | None |
| 14 | 90 | 5 | — | 5 | 80 | None | None | None | None | None | None |
| 15 | 97 | 10 | — | 3 | 73 | None | None | None | None | None | None |

[1]Heat distortion temperature
[2]Mold temperature: 30° C.
[3]Mold temperature: 40° C.
[4]Mold temperature: 50° C.

EXAMPLE 16

A solution comprising 70 parts of MMA, 30 parts of toluene, 0.3 part of lauroyl peroxide and 0.20 part of n-dodecylmercaptan was fed, using a pump, into 1.5 first reactor equipped with a stirrer and a heating jacket at a rate of 0.65 l/hr. The temperature of the first reactor was controlled at about 73° C. by means of the jacket. The first reactor was connected to a second reactor of the same shape and the same volume, and a polymerized polymer was continuously taken out of the second reactor. The temperature of the second reactor was controlled at 80° C. n-Dodecylmercaptan was fed to the second reactor, using a pump, at a rate of 3.0 cc/hr.

The polymer taken out of the second reactor was a soft solid, which was treated in a vacuum drier equipped with a heating jacket to remove toluene and unreacted MMA. A block-like polymer was obtained. Treating conditions were 240° C. in temperature, 1 mmHg in vacuum, and 30 minutes in treating time.

The block-like polymer was crushed by means of a mill, and pelletized using an extruder having a vent. Intrinsic viscosity, [η], molecular weight distribution, Mw/Mn, and HDT were 0.053 l/g, 2.7, and 94° C., respectively. When solvent resistance of the pellets was tested in the same manner as in Examples 1-8, only slight cracks were formed under all the mold temperature conditions of 30° C., 40° C., and 50° C.

EXAMPLE 17

A solution comprising 67 parts of MMA, 3 parts of MA, 30 parts of toluene, 0.1 part of azobisisobutyronitrile and 0.1 part of 2-ethylhexyl thioglycolate was fed at a rate of 3 l/hr. using a pump into a first reactor of the same shape and the same volume as used in Example 16. The first reactor was connected to a second reactor of the same shape and the same volume, and the second reactor was connected to a third reactor of the same shape and the same volume. The first, second, and third reactors were all controlled to 90° C. in temperature.

n-Octylmercaptan was fed into the second and third reactors at rates of 2.1 cc/hr. and 1.2 cc/hr., respectively. Soft solid polymer was taken out of the third reactor. As shown by analysis, the degrees of conversion to the polymer in the first, second, and third reactors were 35%, 50%, and 60%, respectively.

The polymer obtained was heat- and vacuum-treated, crushed and pelletized in the same manner as in Example 16. The intrinsic viscosity, [η], of this polymer was 0.065 l/g, molecular weight distribution, Mw/Mn, was 3.1 and HDT was 95° C. As to solvent resistance, all moldings, at mold temperatures of 30° C., 40° C. and 50° C., showed extremely slight formation of cracks.

EXAMPLE 18

A monomer mixture of 95 parts by weight of methyl methacrylate, 5 parts by weight of methyl acrylate, 0.1 part by weight of methyl acrylate, 0.1 part by weight of azo-bisisobutylonitrile, and n-dodecyl mercaptan in an amount shown in Table 4 was suspended in a suspension phase comprising 250 parts by weight of water and 1 part by weight of potassium polymethacrylate in a jacketed polymerization reactor. Warm water was passed through the jacket, and polymerization was initiated at a polymerization temperature of 75° C. At 70 min. after the initiation, n-dodecyl mercaptan was additionally charged in an amount shown in Table 4, using a charging device attached on the top of the reactor. The degree of conversion to polymer at the time of charging is given in Table 4. Reaction was allowed to proceed, and at 150 min. after initiation, the polymerization temperature was raised to 98° C. Reaction proceeded at this temperature for 120 min., and then the reaction was terminated. The resin thus obtained was cooled, washed treated by filtration, and dried to obtain fine beads. These beads were pelletized by a vented extruder having a diameter of 65 mm.

Table 4 shows the melt index and swell of these pellets, together with intrinsic viscosity [η], Mw/Mn measured by GPC, and proportions of fraction having molecular weight of not more than 20,000 and not less than 1,000,000 (X% and Y%, respectively) measured by GPC.

The pellets were molded into sheets by flat sheeting equipment to evaluate processabilities of resins in flat sheet extrusion. The flat sheeting equipment is composed of a vented extruder having a diameter of 65 mm; a T-die having a lip divergence of 5 mm and a width of 400 mm at the discharge outlet, which die is attached to the vented extruder; three chromeplated glazing and cooling rolls 100 mm in diameter, capable of controlling roll temperature by oil or other liquids; rubber rolls to take off the sheets; and a sheet-cutting means. The extruder and the die were controlled at a suitable temperature in the range of from 220° to 290° C. The extruder speed was set at 10 to 70 r.p.m., and the roll temperature at 70° to 110° C. The space between rolls was adjusted appropriately in response to sheet thickness. The characteristics of the resin was evaluated by measuring the following physical properties at the time of extrusion molding;

Maximum extruder output (Q kg/hr):
The maximum extruder output, at which smooth-surfaced sheets of high quality are obtained without causing any melt fracture.

Maximum width of sheet (L max. mm):
The sheet width, as measured prior to cutting of both sides of the sheet 2 mm thick produced when the temperature of extruder and die was set at 250° C., and the screw speed at 30 r.p.m.

Surface defects (P point):
In a test for maximum width of sheet, the running sheet was monitored from above the glazing rolls for 100 m. If there were any visible stripe patterns or abnormal surface irregularities, they were counted.

As for similar defects continually occurring in the longitudinal directions, one point per one meter was counted up.

Minimum thickness of sheet (T min. mm):
The minimum sheet thickness, at which sheets with no uneven stripe pattern and defect points of less than 20 are produced by forming a resin bank between the first roll and the second roll. The 2-mm flat sheets thus obtained were tested for impact strength.

Falling-weight impact strength (F kg-cm):
The falling-weight impact strength for 50% failure energy, measured in a room kept at 23° C. and a humidity of 50%, as described in JIS K-7211.

Table 4 shows these sheets extrusion characteristics of the acrylic resin and the impact strength of sheet.

All of the samples had excellent processability in extrusion molding, as shown in Table 4, and the sheets obtained had elegant luster. Among them, Samples No. 2 and No. 10 had relatively high levels of swell of 25% and P point.

COMPARATIVE EXAMPLE 1

Acrylic resins were prepared in the same manner as in Example 18, but using different conditions. Results are also given in Table 4. On account of a MI less than 0.1 g/10 min, a [$\eta$] higher than 0.117 l/g, and a Y value higher than 2.5%, Sample No. 1 of Comparative Example 1 had such molding characteristics as Q, P and T min. at almost the same levels as those of the well-known acrylic resins of prior art. Furthermore, surfaces of the sheets thus obtained were less glossy. Samples No. 2 and No. 4 of Comparative Example 1 had good molding characteristics, but had inferior falling-weight impact strength, owing to a swell of more than 40%, a Mw/Mn ratio larger than 4, and a X level in excess of 25%. The molding characteristics of No. 3 were similar to those of conventional arcylic resins, owing to a swell less than 25%, and a Mw/Mn ratio less than 2.3. No. 5, with a MI higher than 20 g/10 min, allowed the production of a sheet having glossy surfaces. However, as obvious from the levels of Q, L max, P, and T min, this sample showed quite poor molding characteristics, resulting in large sagging of resin between die and rolls, the molded sheet had lower impact strength. No. 6, which was a conventionally known acrylic resin, had poorer molding characteristics than the samples of Example 18.

TABLE 4

| Sample No. | n-Dodecyl mercaptan (parts by weight) Initial | n-Dodecyl mercaptan (parts by weight) Additional | Degree of conversion at the time of additional charge (%) | MI (g/10 min.) | Swell (%) | [$\eta$] (l/g) | Mw/Mn | Fraction with mol. wt. of not more than 20,000 X (%) | Fraction with mol. wt. of not less than 1,000,000 Y (%) | Maximum extruder output Q (Kg/Hr) | Maximum width of sheet L max. (mm) | Surface defects P (point) | Minimum thickness of sheets T min. (mm) | Falling weight impact strength F (Kg-cm) | Sheet appearance |
|---|---|---|---|---|---|---|---|---|---|---|---|---|---|---|---|
| Example 18 | | | | | | | | | | | | | | | |
| 1 | 0.05 | 0.29 | 41 | 0.18 | 34 | 0.109 | 4.0 | 9.0 | 2.0 | 38 | 390 | 3 | 1.2 | 11.5 | Lustrous surfaces |
| 2 | 0.10 | 0.10 | 40 | 0.32 | 25 | 0.093 | 2.3 | 4.0 | 0.8 | 35 | 380 | 5 | 1.2 | 11.0 | Lustrous surfaces |
| 3 | 0.10 | 0.29 | 40 | 0.90 | 32 | 0.074 | 3.0 | 10.2 | 0.7 | 40 | 390 | 1 | 1.0 | 10.0 | Lustrous surfaces |
| 4 | 0.10 | 0.52 | 40 | 1.14 | 33 | 0.070 | 3.7 | 15.0 | 0.8 | 40 | 390 | 1 | 1.0 | 8.0 | Lustrous surfaces |
| 5 | 0.15 | 0.30 | 39 | 2.10 | 28 | 0.061 | 2.5 | 9.6 | 0.1 | 40 | 390 | 3 | 1.0 | 11.0 | Lustrous surfaces |
| 6 | 0.15 | 0.50 | 40 | 3.20 | 32 | 0.055 | 2.9 | 13.8 | 0.1 | 42 | 390 | 1 | 1.0 | 8.0 | Lustrous surfaces |
| 7 | 0.15 | 0.81 | 40 | 4.60 | 34 | 0.051 | 3.4 | 19.6 | 0.1 | 42 | 390 | 1 | 1.0 | 7.0 | Lustrous surfaces |
| 8 | 0.20 | 0.50 | 42 | 5.30 | 30 | 0.049 | 2.7 | 15.2 | 0.0 | 40 | 390 | 1 | 1.0 | 8.5 | Lustrous surfaces |
| 9 | 0.20 | 0.90 | 40 | 8.00 | 34 | 0.045 | 3.4 | 23.3 | 0.0 | 42 | 390 | 3 | 1.0 | 6.0 | Lustrous surfaces |
| 10 | 0.30 | 0.29 | 39 | 7.80 | 25 | 0.045 | 2.3 | 12.2 | 0.0 | 38 | 370 | 5 | 1.2 | 9.3 | Lustrous surfaces |
| 11 | 0.30 | 0.50 | 40 | 14.00 | 29 | 0.039 | 2.6 | 19.6 | 0.0 | 42 | 390 | 3 | 1.2 | 6.3 | Lustrous surfaces |
| Comparative Example 1 | | | | | | | | | | | | | | | |
| 1 | 0.05 | 0.10 | 42 | 0.08 | 26 | 0.135 | 2.4 | 3.0 | 3.1 | 32 | 380 | 8 | 1.5 | 12.0 | No luster on surface |
| 2 | 0.10 | 1.52 | 40 | 1.76 | 53 | 0.063 | 6.0 | 37.0 | 0.8 | 40 | 390 | 3 | 1.0 | 4.0 | Lustrous surfaces |
| 3 | 0.15 | 0.10 | 39 | 0.70 | 22 | 0.078 | 2.1 | 3.9 | 0.1 | 30 | 330 | 10 | 1.5 | 12.0 | Lustrous surfaces |
| 4 | 0.20 | 1.52 | 40 | 8.00 | 42 | 0.042 | 4.5 | 40.0 | 0.0 | 40 | 390 | 3 | 1.0 | 4.8 | Lustrous |

TABLE 4-continued

| Sample No. | n-Dodecyl mercaptan (parts by weight) Initial | n-Dodecyl mercaptan (parts by weight) Additional | Degree of conversion at the time of additional charge (%) | MI (g/10 min.) | Swell (%) | [η] (l/g) | Mw/Mn | Fraction with mol. wt. of not more than 20,000 X (%) | Fraction with mol. wt. of not less than 1,000,000 Y (%) | Maximum extruder output Q (Kg/Hr) | Maximum width of sheet L max. (mm) | Surface defects P (point) | Minimum thickness of sheets T min. (mm) | Falling weight impact strength F (Kg-cm) | Sheet appearance |
|---|---|---|---|---|---|---|---|---|---|---|---|---|---|---|---|
| 5 | 0.40 | 0.90 | 0.35 | 23.00 | 30 | 0.030 | 2.8 | 48.7 | 0.0 | 30 | 300 | 18 | 2.0 | 2.5 | Lustrous surfaces |
| 6 | 0.25 | No additional charge | | 1.10 | 19 | 0.072 | 2.0 | 3.6 | 0.0 | 31 | 320 | 10 | 1.5 | 12.0 | Lustrous surfaces |

EXAMPLE 19

Suspension polymerization, pelletizing, and evaluation of extrusion molding characteristics were conducted in a similar manner to Example 18, except that t-dodecyl mercaptan in an amount shown in Table 5 was added to a monomer mixture of 92 parts by weight of methyl methacrylate, 4 parts by weight of ethyl acrylate, 4 parts by weight of n-butyl methacrylate, 0.2 part by weight of t-butyl peroxy-2-ethylhexanoate, and n-octyl mercaptan in an amount shown in Table 5 at a polymerization temperature of 80° C. after a lapse of time from initiation of polymerization given in Table 5.

The degree of conversion to polymer, at the time when t-dodecyl mercaptan has been added, properties of acrylic resins, and evaluation of extrusion molding characteristics are as shown in Table 5. Addition was effected at a degree of conversion in the range of from 15 of 60%. Samples No. 1 through No. 3 of Example 19 gave sheets with glossy surfaces and excellent molding characteristics.

COMPARATIVE EXAMPLE 2

Acrylic resins outside the scope of the present invention were prepared in the same manner as in Example 19, but using different conditions, and were tested for corresponding characteristics. Results are also given in Table 5.

When the additional amount of chain transfer agent was charged at a point when the degree of conversion was below 10% or above 60%, the sheets obtained gave good surfaces like those of Samples No. 1 and No. 2 in Example 19, but did not show any improved molding characteristics.

TABLE 5

| Sample No. | Initial n-dodecyl mercaptan (parts by weight) Initial | Lapse of time from initiation to additional Charge (min.) | Additional n-dodecyl mercaptan (parts by weight) | Degree of conversion at the time of additional charge (%) | MI (g/10 min.) | Swell % | [η] (l/g) | Mw/Mn |
|---|---|---|---|---|---|---|---|---|
| Example 19 | | | | | | | | |
| 1 | 0.15 | 28 | 0.60 | 17 | 2.2 | 25 | 0.060 | 2.3 |
| 2 | 0.20 | 60 | 1.20 | 35 | 2.3 | 28 | 0.061 | 2.5 |
| 3 | 0.20 | 90 | 1.59 | 55 | 2.5 | 33 | 0.063 | 3.4 |
| Comparative Example 2 | | | | | | | | |
| 1 | 0.10 | 15 | 0.90 | 10 | 2.2 | 22 | 0.063 | 2.1 |
| 2 | 0.30 | 110 | 0.30 | 66 | 2.4 | 22 | 0.060 | 2.2 |

| Sample No. | Fraction with mol. wt. of not more than 20,000 X (%) | Fraction with mol. wt. of not less than 1,000,000 Y (%) | Maximum extruder output Q (Kg-Hr) | Maximum width of sheet L max. (mm) | Surface defects P (point) | Minimum thickness of sheets T min. (mm) | Falling weight impact strength F (Kg-cm) | Sheet appearance |
|---|---|---|---|---|---|---|---|---|
| Example 19 | | | | | | | | |
| 1 | 10.6 | 0.8 | 37 | 380 | 3 | 1.3 | 9.8 | Lustrous surfaces |
| 2 | 12.5 | 0.1 | 40 | 390 | 1 | 1.0 | 9.6 | Lustrous surfaces |
| 3 | 14.3 | 0.0 | 40 | 390 | 1 | 1.0 | 10.2 | Lustrous surfaces |
| Comparative Example 2 | | | | | | | | |
| 1 | 9.8 | 0.0 | 30 | 330 | 8 | 1.5 | 10.5 | Lustrous surfaces |
| 2 | 5.5 | 0.0 | 32 | 340 | 7 | 1.5 | 10.3 | Lustrous surfaces |

EXAMPLE 20

A monomer solution comprising 86 parts by weight of methyl methacrylate, 14 parts by weight of methyl acrylate, 0.05 part by weight of lauroyl peroxide, and 0.20 part by weight of n-dodecyl mercaptan was introduced into a batchwise reactor equipped with a heating jacket and a stirrer. A heating medium was passed through the jacket to heat the solution rapidly to 130° C., and the solution was maintained at this temperature for 120 min. Thereafter, a refrigerant was passed through the jacket to cool the reaction mixture down to room temperature, and a part of the mixture was analyzed and found to be a syrup in which 28% of monomers were converted to polymer. To this syrup were added 0.20 part by weight of lauroyl peroxide and 0.38 part by weight of n-dodecyl mercaptan. The mixture was stirred well, and then filled into a polyethylene container of 30×20×3 cm. The container was heated at 60° C. for 10 hr., and then at 100° C. for additional 2 hr., to complete the polymerization. The polymer was taken out of the polyethylene container, ground by a grinder, pelletized in the same manner as in Example 18, and was evaluated for the molding characteristics in sheets extrusion. Results of evaluation were as follows:

MI (g/10 min)—13.30
Swell (%)—30
[η] (l/g)—0.049
Mw/Mn
X (%)—15.2
Y (%)—0.0
Q (Kg/hr)—40
L max (mm)—390
P (point)—1
T min (mm)—1.0
F (Kg-cm)—8.5

This acrylic resin had good molding characteristics such as listed above. The sheet obtained had elegant luster.

ture of 240° C. and a degree of vacuum of 1 mmHg, to remove toluene and unreacted methyl methacrylate. After cooling, there was obtained a hard polymer. Following the procedure of Example 18, the polymer was ground, pelletized, and evaluated for the molding characteristics in sheets extrusion. Results of evaluation are as given in Table 6. The sheet obtained had elegant luster.

COMPARATIVE EXAMPLE 3

Acrylic resins were prepared in the same manner as in Example 21, but using different conditions. Results are also shown in Table 6. Samples No. 1 and No. 2 of Comparative Example 3 were obtained by adding n-dodecyl mercaptan at a point where the degree of conversion to polymer reached 9% in the reactor I. Both of them had Mw/Mn ratios less than 2.3 and poor productivity, as shown in Table 6. In addition, No. 1 was analyzed to have a degree of conversion to polymer of 47% when toluene and unreacted methyl methacrylate were removed therefrom. This level of polymer relative to the amount of methyl methacrylate used is so low that it has no industrial merit.

TABLE 6

| Sample No. | Monomer feed rate (l/Hr) | Temp. in Reactor I (°C.) | Degree of conversion to polymer in Reactor I (%) | Feed rate of n-dodecyl mercaptan (ml/Hr) | Temp. in Reactor II (°C.) | Degree of conversion to polymer in Reactor II (%) | MI (g/10 min.) | Swell (%) | [η] (l/g) | Mw/Mn |
|---|---|---|---|---|---|---|---|---|---|---|
| Example 21 | | | | | | | | | | |
| 1 | 0.65 | 73 | 35 | 0.3 | 73 | 60 | 2.8 | 30 | 0.059 | 2.8 |
| 2 | 0.65 | 73 | 35 | 0.3 | 80 | 82 | 3.0 | 32 | 0.057 | 3.0 |
| 3 | 1.50 | 70 | 15 | 0.7 | 90 | 93 | 2.7 | 25 | 0.058 | 2.3 |
| Comparative Example 3 | | | | | | | | | | |
| 1 | 0.65 | 65 | 9 | 0.3 | 70 | 47 | 1.5 | 22 | 0.065 | 2.2 |
| 2 | 0.65 | 65 | 9 | 0.3 | 80 | 60 | 2.8 | 20 | 0.056 | 2.1 |

| Sample No. | Fraction with mol. wt. of not more than 20,000 X (%) | Fraction with mol. wt. of not less than 1,000,000 Y (%) | Max. extruder output Q (Kg-Hr) | Max. width of sheet L max. (mm) | surface defects P (point) | Min. thickness of sheets T min. (mm) | Falling weight impact strength F (Kg-cm) | Sheet appearance |
|---|---|---|---|---|---|---|---|---|
| Example 21 | | | | | | | | |
| 1 | 10.6 | 0.0 | 38 | 390 | 1 | 1.0 | 9.8 | Lustrous surfaces |
| 2 | 13.6 | 0.0 | 40 | 390 | 1 | 1.0 | 10.0 | Lustrous surfaces |
| 3 | 12.0 | 0.0 | 35 | 350 | 3 | 1.2 | 9.8 | Lustrous surfaces |
| Comparative Example 3 | | | | | | | | |
| 1 | 11.5 | 0.0 | 32 | 330 | 7 | 1.5 | 11.0 | Lustrous surfaces |
| 2 | 12.0 | 0.0 | 31 | 320 | 10 | 1.5 | 9.8 | Lustrous surfaces |

EXAMPLE 21

A solution comprising 70 parts by weight of methyl methacrylate, 30 parts by weight of toluene, 0.3 part by weight of lauroyl peroxide, and 0.2 part by weight of n-dodecyl mercaptan was pumped into a 1.5-liter reactor I equipped with a stirrer and a heating jacket, at a rate shown in Table 6. The reactor I was controlled at a temperature shown in Table 6. The reactor I is connected through a pipe to another reactor II of the same type and capacity. The polymer obtained is taken out of the reactor II in a continuous operation. n-Dodecyl mercaptan was pumped into the pipe between reactors I and II at a rate shown in Table 6. The reactor II was controlled at a temperature shown in Table 6. Results of analysis indicated that the degrees of conversion to polymer were as shown in Table 6. The polymer taken out of the reactor II was a soft mass, which was treated for 30 min. in a vacuum dryer maintained at a tempera-

What is claimed is:

1. An acrylic resin having an intrinsic viscosity [η] of about 0.028 to about 0.117 l/g and a weight-average molecular weight to number-average molecular weight ratio (Mw/Mn), measured by gel permeation chromatography of about 2.3 to about 6.0, said resin comprising the polymerization product of (1) about 50 to 100 wt. % of methyl methacrylate and (2) 0 to about 50 wt. % of at least one monomer selected from the group consisting of acrylic ester monomer amd methacrylic ester monomer, said acrylic ester monomer comprising the reaction product of an alkyl alcohol having 1 to 8 carbon atoms and acrylic acid and said methacrylic ester comprising the reaction product of an alkyl alcohol having 2 to 12 carbon atoms and methacrylic acid.

2. An acrylic resin of claim 1, wherein the amount of methyl methacrylate (1) is in the range of from about 80 to 100 wt. % and the amount of the said monomer or monomers (2) is in the range of from 0 to about 20 wt. %.

3. An acrylic resin of claim 1, wherein the ratio Mw/Mn is of from 2.5 to 6.0.

4. An acrylic resin of claim 2, wherein the resin has a melt index of from 0.1 to 20 g/10 min, a swell of from 25 to 40%, as measured under conditions of ASTM D-1238 (230° C., 3.8 kg), and a falling-weight impact strength of at least 5 kg/cm, as measured on a 50% failure energy test with 2-mm plates in accordance with JIS K-7211.

5. An acrylic resin of claim 4, wherein intrinsic viscosity [$\eta$] is in the range of from 0.033 to 0.117 l/g; Mw/Mn is in the range of from 2.3 to 4.0, as measured by gel permeation chromatography; the fraction having molecular weight of not less than 1,000,000 is not more than 2.5%, and the fraction having molecular weight of not more than 20,000 is not more than 25%.

* * * * *